United States Patent [19]
Stufflet et al.

[11] Patent Number: 5,651,065
[45] Date of Patent: Jul. 22, 1997

[54] INSERTION OF SUPPLEMENTAL BURST INTO VIDEO SIGNALS TO THWART PIRACY AND/OR CARRY DATA

[75] Inventors: Alfred W. Stufflet, Norristown; Richard W. Westerfer, Blue Bell, both of Pa.

[73] Assignee: General Instrument Corporation of Delaware, Chicago, Ill.

[21] Appl. No.: 398,431

[22] Filed: Mar. 9, 1995

[51] Int. Cl.⁶ .................................................. H04L 9/00
[52] U.S. Cl. .................... 380/15; 380/7; 380/14; 348/476
[58] Field of Search .................. 380/11, 14, 15, 380/7; 348/476, 479

[56] References Cited

U.S. PATENT DOCUMENTS

| | | | |
|---|---|---|---|
| 3,679,813 | 7/1972 | Banning, Jr. | 380/15 |
| 4,350,999 | 9/1982 | Mortimer | 348/479 |
| 4,953,208 | 8/1990 | Ideno | 380/15 |
| 5,146,496 | 9/1992 | Westerfer et al. | 380/15 |
| 5,196,921 | 3/1993 | Megeid | 380/15 |
| 5,309,235 | 5/1994 | Naimpally | 348/476 |
| 5,455,630 | 10/1995 | McFarland et al. | 348/476 |

*Primary Examiner*—Salvatore Cangialosi
*Attorney, Agent, or Firm*—Barry R. Lipsitz; Ralph F. Hoppin

[57] ABSTRACT

A video signal is modified to include a supplemental burst signal on at least some of the scan lines for each frame. The supplemental burst signals are used to prevent a pirate decoder from descrambling horizontally sync suppressed scrambled signals by deriving a synchronization timing reference from the color burst signal. The supplemental burst signals can also or alternatively be used to carry data in an otherwise conventional analog video signal.

19 Claims, 3 Drawing Sheets

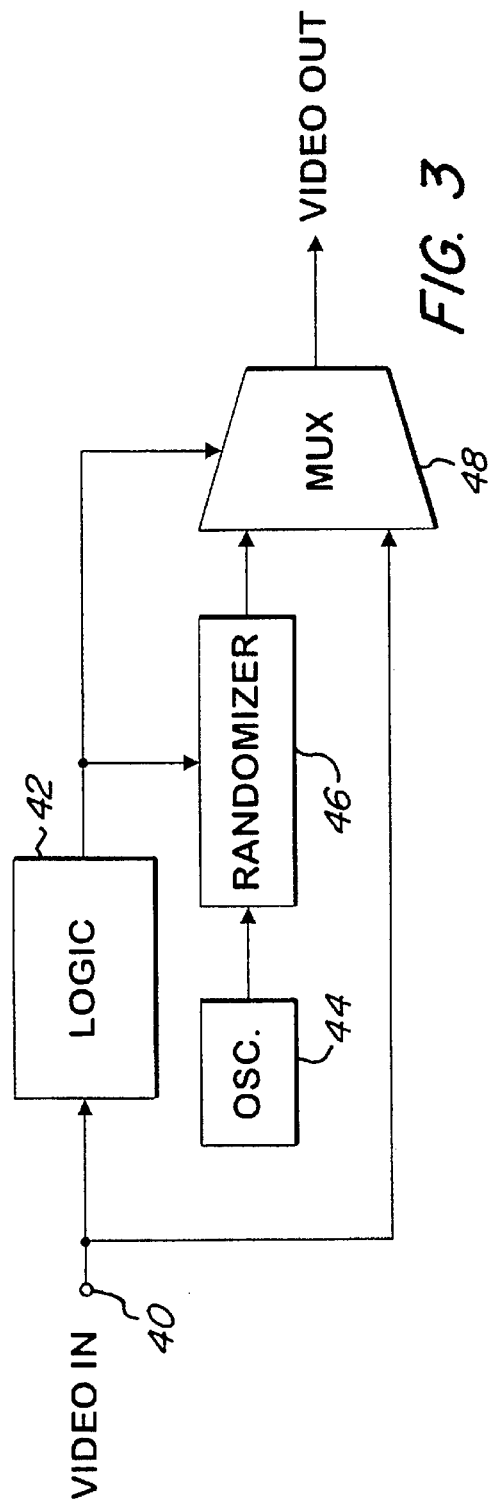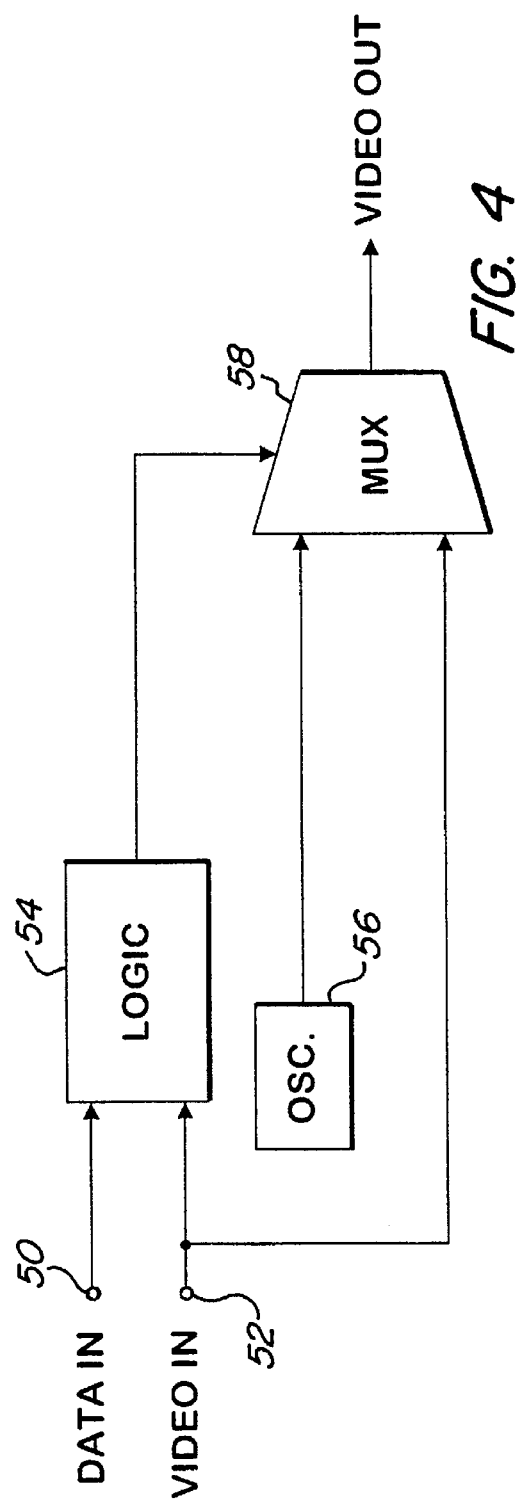

INSERTION OF SUPPLEMENTAL BURST INTO VIDEO SIGNALS TO THWART PIRACY AND/OR CARRY DATA

BACKGROUND OF THE INVENTION

The present invention relates to the distribution of video signals, and more specifically to a scheme for thwarting piracy of subscription television signals and/or the provision of a data service in an analog television signal by inserting supplemental burst signals into video scan lines.

Techniques for scrambling the video portions of television signals are well known. For example, U.S. Pat. No. 3,813,482 to Blonder discloses a system for transmitting television signals wherein the video is scrambled by suppressing vertical or horizontal synchronization pulses to produce a shifting or rolling scrambled picture. In U.S. Pat. No. 4,542,407 to Cooper, et al., apparatus is disclosed for scrambling and descrambling television programs in which the horizontal synchronization information is suppressed at a cable television headend, and then regenerated by a subscriber's cable television converter. U.S. Patent No. 4,095,258 to Sperber, U.S. Pat. No. 4,163,252 to Mistry, et al., and U.S. Pat. No. 4,571,615 to Robbins, et al. describe apparatus for decoding scrambled television signals.

The economic viability of subscription television programming, including cable television and satellite television services, is dependent on the ability of the transmitter to encode or scramble a television signal so that an unauthorized receiver will not be able to receive a viewable television picture. As indicated in the patents cited above, a common technique that has been employed to scramble video signals is to suppress the horizontal synchronization pulses below the average value of the video level. This causes the television receiver to unsuccessfully attempt to lock horizontally on random video peaks rather than on the horizontal synchronization pulses. The loss of effective horizontal synchronization prevents the receiver from properly utilizing the color burst signal associated with the horizontal synchronization pulse, so that color reproduction is also faulty.

In order for a receiver to be able to view the scrambled video signal, the suppressed synchronization pulses must be restored. Two techniques are commonly employed to allow the receiver to recover the suppressed sync and timing information. In one technique, a timing pulse is amplitude modulated on the FM audio carrier of the television signal, which is then detected in the audio portion of the receiver and used to generate the timing signals necessary to descramble the received video signal. In another known technique, some portion of the sync timing pulses, such as during the vertical interval, is transmitted without suppression, i.e., "in the clear." The receiver phase locks to the clear or unsuppressed sync portion to create the required synchronizing and timing information for descrambling the video portions of the signal.

Neither of these known techniques are immune to unauthorized recovery by "pirate" descramblers. Such descramblers are known that will restore usable synchronization to virtually all known prior art sync suppressed video signals. Such devices typically use the color burst component of the video signal as a "key" to recover all other necessary sync and timing information.

All NTSC (National Television Systems Committee) video signals contain a color burst component at 3.58 MHz. The horizontal frequency of the video signal is related to the burst by a factor of 227.5. Therefore, by extracting the 3.58 MHz color burst components from a received scrambled video signal, a horizontal synchronization pulse can be generated and inserted into the video signal where the original pulse has been removed or suppressed. A television receiver can then lock to the new sync pulse so that video information can be viewed.

It would be advantageous to provide a scheme that would preclude the use of the color burst components to recover timing information for descrambling a received video signal. Such a system should not interfere with the descrambling of scrambled signals by the millions of authorized descramblers already installed in the field. One use of the present invention is to provide such a scheme.

It would also be advantageous to provide a scheme for transmitting data in an analog television signal. The digital revolution has provided and will continue to provide many uses for data carried along with a television signal. For example, new data and information services such as teletext, advertising, program information and the like can be provided once a source of data is available in a television signal. Data for the operation of various television receiver functions may also be necessary, and a means for transporting such data to the receiver is required.

Although it is known how to carry data in a single scan line of a television signal, such as by replacing an active video waveform with a waveform representative of digital data, it has not heretofore been possible to easily carry data in an analog television signal outside of the "information portions" of the video scan lines. It is an object of the invention to provide a means for transporting binary information within an analog television signal without significantly degrading the video output that is to be derived from the signal.

The present invention provides apparatus for inserting supplemental burst signals into various lines of an analog television signal in order to prevent the regeneration of synchronization and timing information from the standard color burst signal and to provide a means for carrying data within the analog television waveform. These and other advantages will be apparent from the following description and claims.

SUMMARY OF THE INVENTION

In accordance with the present invention, apparatus is provided for modifying a video signal. The signal defines a set of scan lines for each of a plurality of successive video frames. Each scan line includes a synchronization portion (e.g., a horizontal blanking interval or "HBI") followed by an information portion (e.g., the "active video" portion). The synchronization portion of at least some the scan lines includes a color burst signal. The apparatus comprises means for generating supplemental burst signals. Means are provided for inserting at least one of the supplemental burst signals in each of a plurality of scan lines per video frame. The supplemental burst signals are inserted substantially outside any information portions of the scan lines containing active video. Means are provided for randomizing the insertion of the supplemental burst signals by the inserting means. By randomizing the location of the supplemental burst signals within each video frame, a pirate decoder will be unable to successfully lock onto a burst signal having a fixed and predefined timing. Instead, pirate boxes that attempt to lock onto the standard color burst component will be fooled into thinking that the supplemental burst signals are color burst signals from which timing and synchronization information can be derived. However, since the supplemental burst signals occur randomly throughout the television signal, they will not form a stable, periodic reference that can be used to defeat the scrambling of the signal by conventional sync suppression techniques.

In a preferred embodiment, the supplemental burst signals simulate the color burst signal, and have an amplitude that is greater than or equal to the amplitude of the color burst signal. By providing the supplemental burst signals at an amplitude which is greater than that of a conventional color burst signal, the likelihood that a pirate decoder box will attempt to lock onto a random supplemental burst instead of the conventional color burst is increased. In order to achieve this objective, it is preferable for the supplemental burst signals to have an amplitude that is at least about twice the amplitude of the standard color burst signal. The supplemental burst signals are inserted in portions of the scan lines that are blanked by a receiver of the video signal. For example, the supplemental burst signals can be inserted into the HBI portions of the scan lines.

The means for generating the supplemental burst signals can comprise an oscillator operating at the frequency of the color burst signal. The inserting means can comprise means for multiplexing a burst of n cycles from the oscillator with the scan line into which the burst is to be inserted. In a specific, illustrated embodiment the inserting means insert one cycle of the n cycle burst at the end of one of the scan lines and the remaining n-1 cycles of the burst at the beginning of the next one of the scan lines. In this manner, the supplemental burst signal spans two successive scan lines. In the specific illustrated embodiment, n=6. This illustrated embodiment is an example only, and the number of cycles in the supplemental burst signal as well as the location of the supplemental burst signal within the scan lines is variable and by no means limited to such an implementation.

Apparatus is also provided for modifying an analog video signal to carry digital data. The analog video signal defines a set of scan lines for each of a plurality of successive video frames. Each scan line includes a synchronization portion followed by an information portion. The synchronization portion of at least some of the scan lines includes a color burst signal. The apparatus comprises means for receiving binary data to be carried in the analog video signal. Means are provided for generating supplemental burst signals. Means responsive to the binary data insert the supplemental burst signals into selected ones of the scan lines. The supplemental burst signals are inserted substantially outside any information portions of the scan lines containing active video. A plurality of the scan lines of each video frame are eligible to receive the supplemental burst signals. The eligible lines receive a supplemental burst signal when a first binary level is to be conveyed as dictated by the current bit of the binary data. A supplemental burst signal is not placed on an eligible line when a second binary level dictated by the current bit of the binary data is to be conveyed. For example, for each binary "one" represented by the binary data, a supplemental burst signal can be inserted on an eligible video scan line, whereas no supplemental burst signal would be placed on an eligible scan line for a binary data bit representative of a zero.

The supplemental burst signals representative of data can simulate a conventional color burst signal, and have an amplitude that is greater than or equal to the amplitude of the color burst signal. The supplemental burst signals are inserted into portions of the scan lines that are blanked by a receiver of the video signal. For example, the supplemental burst signals can be inserted substantially in portions of the scan lines corresponding to a horizontal blanking interval.

The means for generating the supplemental burst signals can comprise an oscillator operating at the frequency of the color burst signal. The inserting means can comprise means for multiplexing a burst of n cycles from the oscillator with the scan line into which the burst is to be inserted.

Video signal receiver apparatus is provided for extracting digital information carried in an analog video signal. Means are provided for monitoring a plurality of scan lines of a video frame to detect the presence or absence of supplemental burst signals that may be carried in the scan lines in addition to a color burst signal carried in the scan lines. Means responsive to the monitoring means reconstruct a binary data stream based on the presence or absence of the supplemental burst signals on the scan lines. Means are provided for blanking the portions of the scan lines that carry the supplemental burst signals to prevent visual artifacts due to the supplemental burst signals from appearing in a video picture reconstructed from the scan lines.

The monitoring and reconstructing means can comprise means for counting the scan lines in the video frame. Means responsive to the counting means output the scan lines that may carry the supplemental burst signals. The scan lines output from the outputting means are filtered to detect the presence of any supplemental burst signals thereon. A first binary level is output when the filtering means detect the presence of a supplemental burst signal. A second binary level is output when the presence of a supplemental burst signal is not detected.

In an illustrated embodiment, the supplemental burst signals simulate the color burst signal. In this embodiment, the filtering means comprise a bandpass filter tuned to the frequency of the color burst signal.

BRIEF DESCRIPTION OF THE DRAWINGS

FIG. 3 is a block diagram of an encoder for inserting supplemental bursts into the video waveform in a random manner to thwart piracy of a scrambled video signal;

FIG. 4 is a block diagram of an encoder for inserting supplemental bursts into a video waveform to carry data.

DETAILED DESCRIPTION OF THE INVENTION

Figure 1:
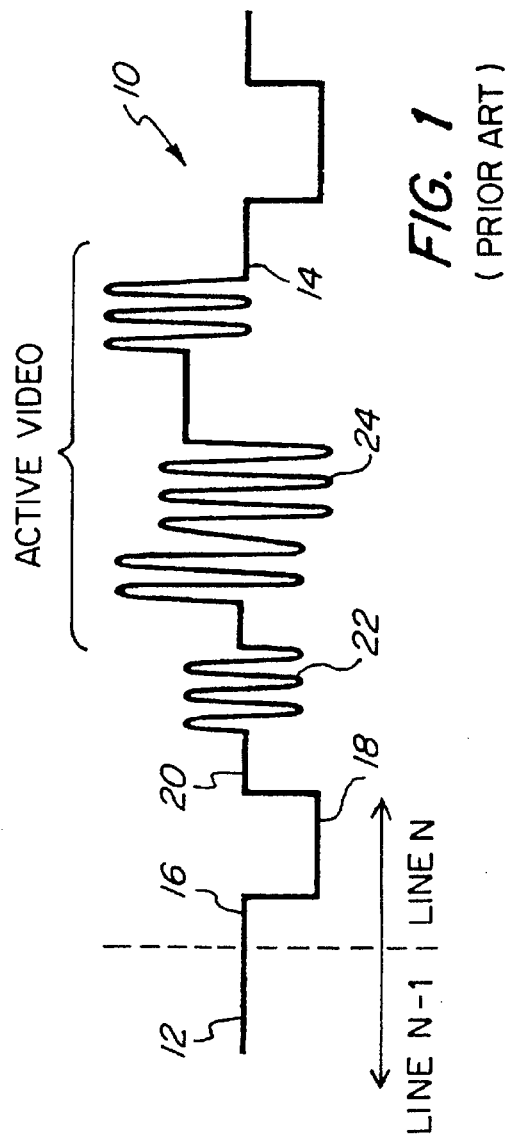
FIG. 1 is an illustration of a prior art video waveform.

FIG. 1 illustrates a prior art television waveform generally designated 10 in which a horizontal scan line 14 contains a horizontal synchronization pulse 18 followed by a color burst 22 which, in turn, is followed by the active video information 24 from which a line of a television picture is reconstructed. Scan line 14 (line N) is preceded by the previous scan line 12 (line N-1). The horizontal synchronization pulse 18 is preceded by a "front porch" 16 and followed by a "back porch" 20, as well known in the art.

The color burst 22 of the television signal occurs once per line, and can therefore be used as a timing reference to derive horizontal synchronization pulses when the original sync pulses 18 have been attenuated or suppressed to scramble the video signal. Thus, a periodically occurring color burst can be used by a "pirate" to create an unauthorized descrambler that will defeat the sync suppressed scrambling of the television signal.

Figure 2:
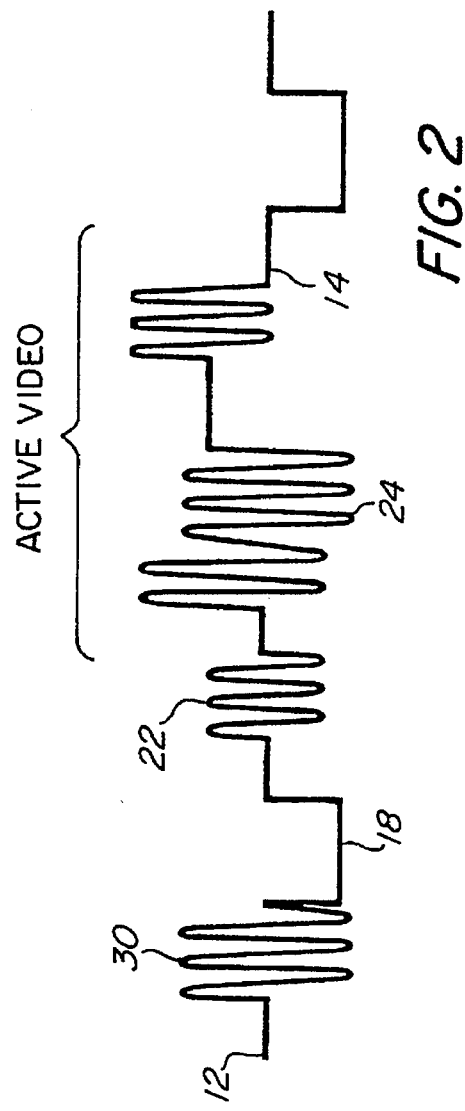
FIG. 2 is an illustration of a video waveform including a supplemental burst in accordance with the present invention.

In order to prevent the piracy of scrambled signals by such unauthorized converters, the present invention provides a supplemental burst 30 in the television waveform, preferably at the interface between two adjacent horizontal scan lines such as scan lines 12 and 14 illustrated in FIG. 2. In a preferred embodiment, the supplemental bursts 30 are provided randomly on different lines of a television signal, have the same frequency as the conventional color burst 22, and have an amplitude which is greater than that of a standard color burst. For example, the amplitude of supplemental bursts 30 can be about two or three times the amplitude of a conventional color burst 22. In this manner, when the television signal is suppressed in order to provide sync suppression scrambling, the supplemental burst 30 will have an amplitude that is similar to that of an unsuppressed color burst signal.

By providing the supplemental burst, a pirate decoder trying to establish timing from the real color burst will falsely lock on the supplemental burst 30 and be unable to derive accurate horizontal synchronization timing information. By randomly placing the supplemental bursts 30 on different lines of a television signal, a pirate decoder will become confused, sometimes locking on a real color burst 22 and other times, when a supplemental burst 30 is present, locking on the supplemental burst which has an amplitude that is equal to or preferably greater than that of the actual color burst. The randomization of the supplemental burst 30 throughout the television signal will make it impossible for a pirate decoder to properly derive horizontal synchronization timing.

Supplemental bursts 30 can also be used by themselves or in conjunction with the anti-piracy mode of operation to provide a data service in an otherwise conventional analog television signal. If a receiver is provided with the same randomization algorithm as the transmitter, it will have knowledge as to when each supplemental burst is expected in the received signal. In order to communicate one binary signal (e.g., a binary "one"), a supplemental burst 30 is provided at the specified time. If the other binary level (e.g., a binary "zero") is to be communicated, no supplemental burst 30 is provided at the designated time. In an alternate embodiment, the presence of a supplemental burst can be used to designate a logic "zero" while the absence of a supplemental burst can be used to designate a logic "one."

It is also possible to provide a data service by providing such data on predefined lines every frame. For example, a receiver can look at each predefined line and if a supplemental burst 30 is present, it will know that a first binary level has been sent as a data bit. If the supplemental burst is not present, the receiver will know that the other binary level has been sent as a data bit. In this implementation, the supplemental bursts will still occur on a random basis, depending on the data being sent. Thus, both the anti-piracy mode and the data service mode of operation can be provided concurrently. The random nature of the data itself provides the randomization of the supplemental bursts.

FIG. 3 illustrates an embodiment of an encoder that can be used to provide the supplemental bursts on a random basis to defeat pirate decoders. The encoder of FIG. 3 is provided at a transmitter, such as a cable television headend which is sending the scrambled television signals to a plurality of subscribers. The video signal is input via a terminal 40 to logic 42 that locates the portions of the television waveform into which supplemental bursts are to be inserted. For example, logic 42 can locate the horizontal blanking interval in each line of a television signal so that the supplemental bursts 30 can be inserted into this portion of the waveform. As well known in the art, the horizontal blanking interval is a portion of the waveform that comprises the horizontal synchronization pulse 18 and color burst 22. This portion of the waveform is blanked at a receiver after the synchronization and color burst information have been obtained therefrom, to prevent this information from interfering with the reproduction of a picture based on the active video portions of the scan lines.

It is advantageous to place the supplemental bursts within the HBI to take advantage of the fact that the standard horizontal blanking circuitry will blank the supplemental bursts without the need for any additional hardware. In an actual implementation of the invention, the supplemental bursts can comprise six cycles at the standard 3.58 MHz color burst frequency, with one cycle at the end of a first line (e.g., line 12) and the remaining five cycles on the front porch 16 of the next horizontal scan line 14. Such an implementation is only an example, and those skilled in the art will appreciate that the exact placement of the supplemental burst as well as the number of cycles used, the frequency and the magnitude thereof can be varied. To defeat piracy, the main requirement for the supplemental burst is that it simulate a standard color burst enough to trick a pirate decoder. For carrying data, it is not necessary to simulate a color burst, and any suitable supplemental burst can be used as long as it can be detected at the receiver and is sufficiently blanked at the receiver (preferably by the standard receiver blanking circuitry) to avoid interference with the reconstructed video.

The logic 42 of FIG. 3 controls a multiplexer 48 that adds the supplemental bursts to the video input at terminal 40, at the appropriate times in the video waveform. The supplemental burst is provided by an oscillator 44, which can be 3.58 MHz oscillator to provide a supplemental burst which simulates a standard color burst signal. A randomizer 46, which can simply be a switch, is controlled by logic 42 to randomly pass supplemental bursts from the oscillator 44 to the multiplexer 48, such that the bursts will not appear in the video output from the multiplexer in a periodic manner that could be used to derive a timing reference. Thus, even though logic 42 might actuate multiplexer 48 to insert a supplemental burst in the video waveform for every horizontal scan line, the randomizer 46 would not provide a supplemental burst to the multiplexer every scan line. Instead, the supplemental bursts would be provided in a random manner that would confuse a pirate decoder.

FIG. 4 illustrates another implementation of the encoder circuitry which is used when data is to be transmitted via a supplemental burst. Since the data itself is generally random, the same supplemental bursts used to carry the data can serve the function of confusing pirate decoders to prevent such decoders from consistently locking onto the color burst signal to derive timing information. Data to be carried on the waveform in the form of supplemental bursts is input via terminal 50 to logic circuitry 54. When a first logic level (e.g., a binary "one") is present in the incoming data, logic 54 will actuate multiplexer 58 to insert a supplemental burst from oscillator 56 into the desired location of the video waveform. The video is input to logic 54 and multiplexer 58 via video input terminal 52. Logic circuit 54 requires the video input to know when the appropriate time has come to actuate multiplexer 58 such that the supplemental burst will be inserted into the proper location in the video waveform. As indicated above, it is preferable to insert at least the majority of the supplemental burst into the HBI portion of the video waveform. Oscillator 56 can comprise a 3.58 MHz oscillator if it is desired for the supplemental bursts to simulate a standard color burst. Logic 54 will actuate multiplexer 58 for a time period that is long enough to insert a supplemental burst of the desired number of cycles from oscillator 56.

Figure 5:
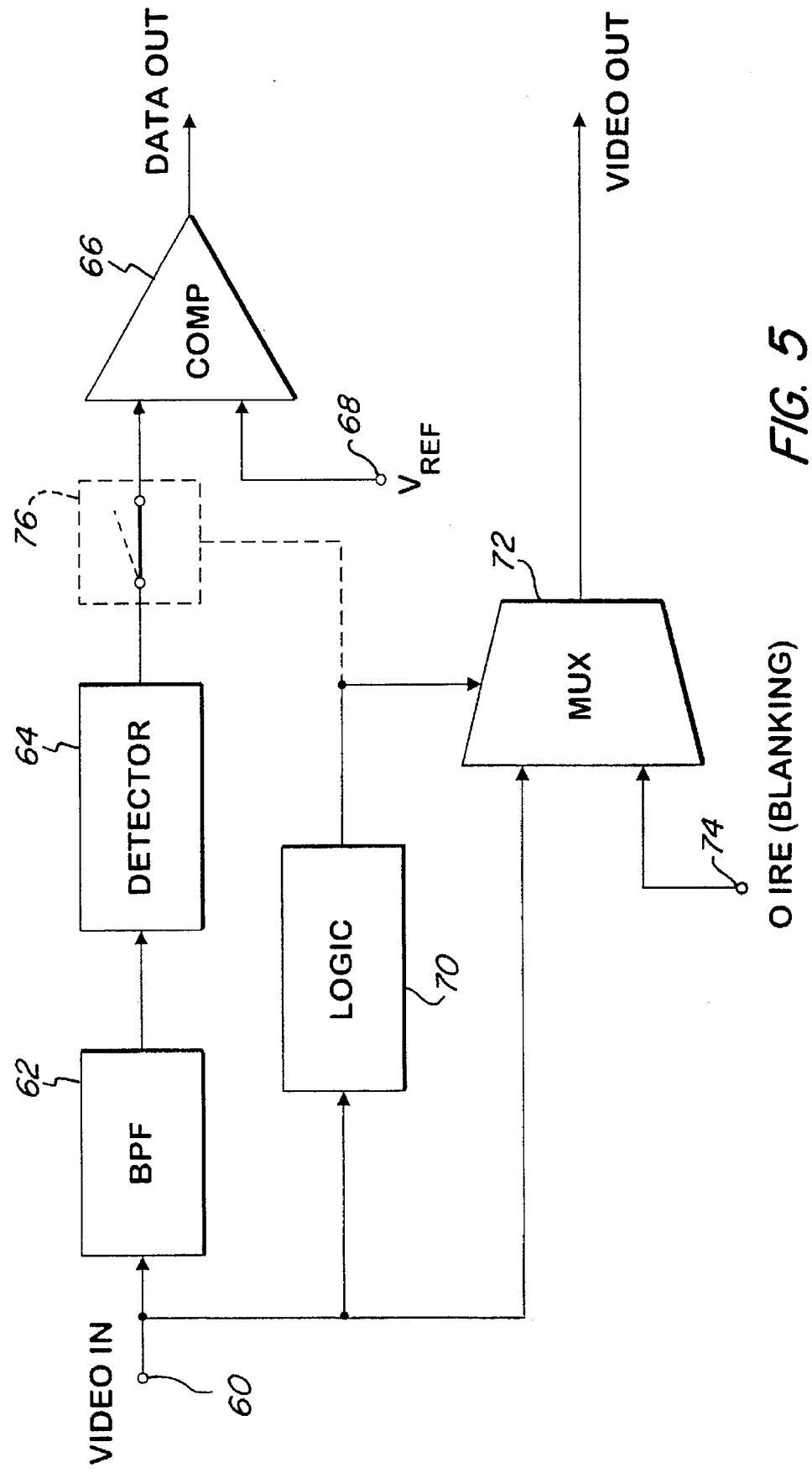
FIG. 5 is a block diagram of video signal receiver apparatus for extracting the digital data inserted by the encoder of FIG. 4.

FIG. 5 is a block diagram of receiver circuitry for extracting the data carried by the supplemental burst signals on the video waveform. The received video signal, which has already been recovered from a carrier using conventional tuning and demodulation circuitry (not shown) is input via terminal 60 to a bandpass filter 62, logic circuitry 70 and a multiplexer 72. The bandpass filter will pass the frequency of the supplemental burst signals (e.g., 3.58 MHz) to a detector 64, such as a conventional chroma detector. A comparator 66 will compare the magnitude of the detected burst signals to a reference voltage $V_{REF}$ input via terminal 68. The reference voltage is set to distinguish supplemental bursts from conventional color bursts. By providing the supplemental bursts at a higher magnitude than conventional color bursts, only the supplemental bursts (which will exceed $V_{REF}$) will be recognized as data by comparator 66 and output as such data.

Logic circuitry 70 and multiplexer 72 are conventional components found, for example, inside of a cable television converter. Logic 70 determines when the horizontal blanking interval of the input video signal is about to occur, and actuates multiplexer 72 during this interval to blank this portion of the video signal with a zero IRE (i.e., blanking) level potential input via terminal 74. As well known in the art, IRE units are units of measurement for video levels specified initially by the Institute of Radio Engineers. At the completion of each scan line in a receiver or monitor, the horizontal synchronizing pulse in the composite video signal triggers the scanning circuits to return the CRT beam rapidly to the left of the screen for the start of the next scan line. During the return time, the horizontal blanking signal prevents the retrace lines from being visible by providing the zero IRE level, which is lower than that corresponding to the blackest portion of the scene. The blackest portion of a scene is at a "reference black" level of 7.5 IRE, and the whitest portions of the signal ("reference white") are at a level of 100 IRE.

Logic 70 in FIG. 5 can also be used to refine the detection of data from the video signal. In particular, since the logic will know when the horizontal blanking interval is about to occur, it can control an optional switch 76 between detector 64 and comparator 66 that only allows the comparator to detect data during the portion of the waveform on which the supplemental bursts are potentially inserted.

It should now be appreciated that the present invention provides apparatus for modifying a video signal to include a supplemental burst on all or a selected subset of the horizontal scan lines. The supplemental burst is useful both for preventing piracy of a sync suppressed scrambled signal and/or carrying data in an otherwise conventional analog video signal. By placing the supplemental bursts substantially in the horizontal blanking interval of the scan lines, the conventional blanking circuitry at the receiver will blank the supplemental bursts to prevent interference with the reconstructed video. In a preferred implementation, one cycle of the supplemental burst is provided at the end of a first scan line, and the remaining cycles of the burst reside at the commencement of the next scan line, i.e., on the front porch of the next line's horizontal synchronization pulse. In order to confuse pirate decoders, the supplemental burst simulates a conventional color burst signal, but preferably has a greater amplitude on the order of two to three times the color burst amplitude in order to facilitate the recovery of the supplemental burst as data.

Although the invention has been described in connection with various preferred and illustrated embodiments, it should be appreciated that numerous adaptations and modifications may be made thereto without departing from the spirit and scope of the invention as set forth in the claims.

We claim:

1. Apparatus for modifying a video signal to prevent unauthorized recovery thereof, said signal defining a set of scan lines for each of a plurality of successive video frames, each scan line including a synchronization portion followed by an information portion, the synchronization portion of at least some of said scan lines including a color burst signal, said apparatus comprising:

means for generating supplemental burst signals;

means for inserting said supplemental burst signals in said scan lines in addition to the color burst signals in said synchronization portion, said supplemental burst signals being inserted substantially outside any of said information portions which contain active video; and means for randomizing the insertion of said supplemental burst signals by said inserting means.

2. Apparatus in accordance with claim 1 wherein said supplemental burst signals simulate said color burst signal, and have an amplitude that is greater than or equal to the amplitude of said color burst signal.

3. Apparatus in accordance with claim 1 wherein said supplemental burst signals are inserted in portions of said scan lines that are blanked by a receiver of the video signal.

4. Apparatus in accordance with claim 3 wherein said supplemental burst signals are inserted substantially in portions of said scan lines corresponding to a horizontal blanking interval.

5. Apparatus in accordance with claim 2 wherein:

said means for generating said supplemental burst signals comprise an oscillator operating at the frequency of said color burst signal; and said inserting means comprise means for multiplexing a burst of n cycles from said oscillator with the scan line into which said burst is to be inserted.

6. Apparatus in accordance with claim 5 wherein said inserting means insert one cycle of said n cycle burst at the end of one of said scan lines and the remaining n−1 cycles of said burst at the beginning of the next one of said scan lines, such that each supplemental burst signal spans two successive scan lines.

7. Apparatus in accordance with claim 6 wherein n=6.

8. Apparatus in accordance with claim 5 wherein said supplemental burst signals have an amplitude that is at least about twice the amplitude of said color burst signal.

9. Apparatus in accordance with claim 2 wherein said supplemental burst signals have an amplitude that is at least about twice the amplitude of said color burst signal.

10. Apparatus for modifying an analog video signal to carry digital data, said signal defining a set of scan lines for each of a plurality of successive video frames, each scan line including a synchronization portion followed by an information portion, the synchronization portion of at least some of said scan lines including a color burst signal, said apparatus comprising:

means for receiving binary data;

means for generating supplemental burst signals; and means responsive to said binary data for inserting said supplemental burst signals into selected ones of said scan lines in addition to the color burst signals in said synchronization portion, said supplemental burst signals being inserted substantially outside of said information portions which contain active video;

wherein a plurality of said scan lines of each video frame are eligible to receive said supplemental burst signals, said eligible lines receiving a supplemental burst signal when a first binary level is to be conveyed and not receiving a supplemental burst signal when a second binary level is to be conveyed.

11. Apparatus in accordance with claim 10 wherein said supplemental burst signals are inserted in portions of said scan lines that are blanked by a receiver of the video signal.

12. Apparatus in accordance with claim 11 wherein said supplemental burst signals are inserted substantially in portions of said scan lines corresponding to a horizontal blanking interval.

13. Apparatus in accordance with claim 10 wherein:

said means for generating said supplemental burst signals comprise an oscillator operating at the frequency of said color burst signal; and said inserting means comprise means for multiplexing a burst of n cycles from said oscillator with the scan line into which said burst is to be inserted.

14. Apparatus in accordance with claim 13 wherein said inserting means insert one cycle of said n cycle burst at the end of one of said scan lines and the remaining n−1 cycles of said burst at the beginning of the next one of said scan lines, such that each supplemental burst signal spans two successive scan lines.

15. Apparatus in accordance with claim 14 wherein n=6.

16. Apparatus in accordance with claim 10 wherein said supplemental burst signals have an amplitude that is greater than the amplitude of said color burst signal.

17. Video signal receiver apparatus for extracting digital information carried in an analog video signal, comprising:

means for monitoring a plurality of scan lines of a video frame to detect the presence or absence of supplemental burst signals that are carried in said scan lines in addition to a color burst signal carried in said scan lines wherein said supplemental burst signals simulate said color burst signal, and have an amplitude that is greater than or substantially equal to the amplitude of said color burst signal;

means responsive to said monitoring means for reconstructing a binary data stream based on the presence or absence of said supplemental burst signals on said scan lines; and means for blanking the portions of said scan lines that carry said supplemental burst signals to prevent artifacts due to said supplemental burst signals from appearing in a video picture reconstructed from said scan lines.

18. Apparatus in accordance with claim 17 wherein said monitoring and reconstructing means comprise:

means for counting the scan lines in said video frame;

means responsive to said counting means for outputting said scan lines that may carry said supplemental burst signals;

means for filtering the scan lines output from said outputting means to detect the presence of a supplemental burst signal; and means for outputting a first binary level when said filtering means detect the presence of a supplemental burst signal and for outputting a second binary level when the presence of a supplemental burst signal is not detected.

19. Apparatus in accordance with claim 18 wherein said supplemental burst signals simulate said color burst signal, and said filtering means comprise a band pass filter tuned to the frequency of said color burst signal.

* * * * *